United States Patent
Chergui (10) Patent No.: US 10,160,057 B2
(45) Date of Patent: Dec. 25, 2018

(54) METHOD AND DEVICE FOR THE OPTIMIZED RESISTANCE WELDING OF METAL SHEETS

(71) Applicants: THYSSENKRUPP STEEL EUROPE AG, Duisburg (DE); THYSSENKRUPP AG, Essen (DE)

(72) Inventor: Azeddine Chergui, Dortmund (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 397 days.

(21) Appl. No.: 14/887,066

(22) Filed: Oct. 19, 2015

(65) Prior Publication Data

US 2016/0114421 A1 Apr. 28, 2016

(30) Foreign Application Priority Data

Oct. 17, 2014 (DE) .................. 10 2014 115 145

(51) Int. Cl.
*B23K 11/11* (2006.01)
(52) U.S. Cl.
CPC .................. *B23K 11/115* (2013.01)
(58) Field of Classification Search
CPC ......... B23K 9/007; B23K 11/10; B23K 11/11; B23K 11/115

(Continued)

(56) References Cited

U.S. PATENT DOCUMENTS 4,650,951 A * 3/1987 Koga .................. B23K 11/163
219/118
5,866,868 A 2/1999 Hirane
(Continued)

FOREIGN PATENT DOCUMENTS

CN 101274387 A 10/2008
CN 102794557 A 11/2012
(Continued)

OTHER PUBLICATIONS

Office Action from German Patent Office dated Aug. 27, 2015 for German priority patent application No. 102014115145.3.
(Continued)

*Primary Examiner* — Brian W Jennison
(74) *Attorney, Agent, or Firm* — thyssenkrupp North America, Inc.

(57) ABSTRACT

The invention relates to a method for the resistance welding of a metal sheet to a further metallic component, wherein the metal sheet is welded to the further component by a flow of electric current for welding in a circuit comprising the metal sheet, the further component, a first welding electrode and a second welding electrode, wherein the first welding electrode is in contact with the metal sheet and the second welding electrode, lying opposite the first welding electrode, is in contact with the further component on the side of the further component that is facing away from the metal sheet, wherein, in a first phase, the metal sheet is subjected at least for a time to a first force at least by the first welding electrode and, in a second phase, the metal sheet is subjected at least for a time to a second force at least by the first welding electrode during the flow of electric current for welding, the second force being lower than the first force.

12 Claims, 10 Drawing Sheets

(58) Field of Classification Search
USPC .............. 219/86.1, 87, 90, 91.1, 91.2, 91.22
See application file for complete search history.

(56) References Cited

U.S. PATENT DOCUMENTS

| | | | |
|---|---|---|---|
| 2011/0272384 A1* | 11/2011 | Matsushita | B23K 11/115 219/91.2 |
| 2014/0224774 A1* | 8/2014 | Chergui | B23K 11/002 219/91.2 |
| 2014/0367368 A1* | 12/2014 | Yang | B23K 11/0033 219/91.22 |

FOREIGN PATENT DOCUMENTS

| | | |
|---|---|---|
| CN | 103702792 A | 4/2014 |
| DE | 102007056335 A1 | 5/2009 |
| DE | 102013108563 A1 | 2/2015 |
| JP | S61115687 A | 6/1986 |
| JP | S6281276 A | 4/1987 |

OTHER PUBLICATIONS

English translation of the written description section (specification) of DE 102007056335 (A1), a reference cited in the above-listed German Office Action for the German priority patent application No. 102014115145.3.

English translation of the written description section (specification) of DE 102013108563 (A1), a reference cited in the above-listed German Office Action for the German priority patent application No. 102014115145.3.

Welding Engineer Handbook, 2nd Edition, Chen Zhunian, p. 506, Mechanical Industry Press, Feb. 2010. [English translation unavailable].

English language Abstract for JP S61115687 A listed above.

* cited by examiner

METHOD AND DEVICE FOR THE OPTIMIZED RESISTANCE WELDING OF METAL SHEETS

CROSS-REFERENCE TO RELATED APPLICATIONS

This application claims priority to prior filed German Patent Application Serial No. DE 102014115145.3 filed Oct. 17, 2014, the entire contents of which is hereby incorporated by reference herein.

FIELD

This disclosure relates to a method and device for the resistance welding of a metal sheet to a further metallic-component.

BACKGROUND

For weight saving in motor vehicle construction, components that have characteristics and relative thicknesses adapted to the loads occurring are used. This makes it necessary to weld components, in particular steel components, of different characteristics and/or different thicknesses to one another, for example a thin metal sheet to two thicker metal sheets. In addition, the increasing demand for lightweight designs to obtain further weight saving in the motor vehicle sector is giving preeminence to the use of sandwich sheets, which have for example thin metal sheets as outer layers and a layer of plastic arranged in between. These sandwich sheets may have characteristics such as a low weight with at the same time high strength. What is more, they can be sound-damping and offer great stiffness. Sandwich sheets too often have to be connected to further components by means of welding. In particular in vehicle bodyshell work, resistance welding, in particular resistance spot welding, is often used.

However, it is problematic for example that the aforementioned great differences in thickness or different characteristics of the components to be welded may also have the effect that, although the thicker components are welded to one another, thin metal sheets are not completely fused by the weld nugget or are not fused at all. This means that thin sheets cannot be connected to the further components in a reliable process. This is caused by process-dependent limitations, such as the distribution of the current density in dependence on the electrical resistance. In order to counteract this, it is known to achieve targeted control of the depth of the weld spot, by providing an additional input of heat. For example, an intermediate strip may be provided between a welding electrode and a thin metal sheet, so that as a result an increase in the interface resistance between the electrode and the thin sheet is achieved. Special electrodes, for example of tungsten, may also be used in order to achieve a further input of heat. A disadvantage of this, however, is that such solutions cannot be implemented cost-effectively in mass production on account of high costs or increased plant maintenance.

SUMMARY

Described herein is a method and device for the resistance welding of a metal sheet to a further metallic component. In an embodiment of the method as disclosed herein, a metal sheet is welded to a metallic component by a flow of an electric welding current in a circuit that is made up of at least the metal sheet, the metallic component, a first welding electrode, and a second welding electrode. The first welding electrode is placed in contact with the metal sheet, and the second welding electrode, which is disposed opposite the first welding electrode, is placed in contact with the metallic component on a side of the metallic component that is facing away from the metal sheet. In an embodiment of a device as disclosed herein, a first and a second welding electrode are provided that are configured to produce a welded connection between the metal sheet and the metallic component. A means for producing an electrical circuit that conducts a flow of electrical current sufficient for use in welding and creating welded connections is placed in electrical communication with the first and second electrodes.

One benefit of the present disclosure is the provision of an easy and low-cost method for the resistance welding of a metal sheet to a further component and also a corresponding device, wherein a reliable connection of the metal sheet to the component can be achieved.

BRIEF DESCRIPTION OF THE DRAWINGS

The present invention is described in detail below with reference to the attached drawing figures, wherein.

DETAILED DESCRIPTION

Various embodiments now will be described more fully hereinafter with reference to the accompanying drawings, which form a part hereof, and which show, by way of illustration, specific embodiments. However, this invention may be embodied in many different forms and should not be construed as limited to the embodiments set forth herein. Rather, these embodiments are provided so that this disclosure will be thorough and complete, and will fully convey the scope of the invention to those skilled in the art. The following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments may be readily combined without departing from the scope or spirit of the present disclosure.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

An embodiment of a method for resistance welding a metal sheet to a metallic component comprises, in a first phase, subjecting a metal sheet to a first force, applied by at least a first welding electrode, for a first predetermined amount of time. In a second phase, the metal sheet is subjected to a second force, applied at least by the first welding electrode for a second predetermined amount of time, during the flow of electric current for welding. The magnitude of the second force applied to the metal sheet is smaller than the magnitude of the first force.

It has been found that the use of a first force in a first phase initially allows mutual contact of the metal sheets and/or components to be welded to be ensured. Subsequently, in a second phase, the use of a second force, lower in comparison with the first force, on the side of the metal sheet during the flow of electric current for welding means that the contact area between the first welding electrode and the (outer) metal sheet is reduced. This leads to an increase in the current density in the region of the first welding electrode or in the region of the metal sheet contacted therewith. This achieves the effect in an easy and low-cost way that the formation of the weld nugget in the region of the metal sheet is sufficient to achieve a connection of the metal sheet to the other metal sheets and/or components by welding.

A method and a device for the resistance welding of a metal sheet to a further metallic component should be understood as meaning that at least one metal sheet and at least one further component are provided. Preferably, more than one metal sheet (for example two sheets in the form of a sandwich sheet) and/or more than one further component (for example two further components, for example two solid metal sheets) are provided.

The metal sheet may in particular be a steel sheet. The metal sheet may in particular be part of a composite sheet, which for example has outer metal sheets as outer layers. In this case, the first welding electrode is for example in contact with one of the outer layers. The further component may for example be designed as a further metal sheet, for example a steel sheet. For example, the further component is a solid metal sheet. For example, the further component has a greater thickness than the metal sheet. It is also likewise possible however for a number of components that are to be welded to one another and to the metal sheet to be provided. The resistance welding may in particular be designed as resistance spot welding.

The first and/or second force may for example be exerted by a welding robot. For example, the welding electrodes may be part of a welding tongs (for example a spot welding tongs). For example, the maximum force that the first welding electrode exerts on the metal sheet in the first phase corresponds to the first force. For example, the maximum force that the first welding electrode exerts on the metal sheet in the second phase corresponds to the first or the second force. The first force and/or the second force may for example be achieved by a joint action of the opposing first and second welding electrodes.

The first phase serves for example for ensuring sufficient contact between the metallic layers to be welded and/or a phase for the heating of the metal sheet and/or the component. The second phase serves for example for the welding of the metallic layers.

The circuit that allows the flow of current for welding, comprising the metal sheet, the further component, the first welding electrode and the second welding electrode, represents a first circuit.

According to a refinement of the method, the metal sheet is welded to a first further metallic component and a second further metallic component. In this case, the first further component is arranged between the metal sheet and the second further component and the second welding electrode is in contact with the second further component, on the side of the second further component that is facing away from the metal sheet and from the first further component. It has been found that the method is advantageous in particular in the case of welding at least three layers, i.e. the connection of at least one metal sheet to the two further components, since a connection of the metal sheet to the two further components can take place reliably. For example, it can be ensured that the metal sheet is fused by the weld nugget. The weld nugget therefore not only forms between the two further components, but can extend up to the metal sheet. This can be achieved even in the case of a metal sheet that is thinner in comparison with the further components, in particular in comparison with the first further component.

According to a further refinement of the method, the metal sheet is a metallic outer layer of a sandwich sheet, wherein the sandwich sheet has two metallic outer layers and a layer of thermoplastic material arranged between the metallic outer layers. With this method, a sandwich sheet can be welded particularly advantageously to one or more further components. Sandwich sheets often have particularly thin metal sheets as outer layers, which have to be connected to the one or more further components. In addition, by applying the (greater) first force in the first phase, it can initially be achieved that the metal sheet that is in contact with the first welding electrode is brought into contact with the further outer layer, so that resistance welding is made possible. The first force can be chosen here to be as great as is necessary for this. In the second phase, a reduction of the force can then take place by means of the flow of electric current for welding, so that the first welding electrode subjects the metal sheet to a (lower) second force, whereby the contact area between the first welding electrode and the metal sheet, i.e. the outer layer of the sandwich sheet, is reduced. This means that the current density in the region of the first welding electrode or in the region of the metal sheet is increased. As a result, a reliable connection of the sandwich sheet to the one component or the number of components can take place.

According to a further refinement of the method, in the first phase the region of the sandwich sheet that is to be welded is heated at least for a time in such a way that the layer of thermoplastic material softens and is displaced from the welding area by pressing together the outer layers, wherein the outer layers of the sandwich sheet are pressed together by being subjected to the first force in the first phase. The heating makes it particularly easy to achieve the effect that the outer layers are pressed together and the required (first) force can be reduced. This means that, if appropriate, the contact area can continue to be reduced while applying the second force, for example during the flow of electric current for welding, so that the current density in the region of the first welding electrode or the metal sheet can be increased. The pressing together advantageously takes place by the first and the second welding electrode.

According to a further exemplary embodiment of the method, for heating the region of the sandwich sheet that is to be welded there is provided a second circuit, which comprises the second welding electrode, at least partially the further component and a current bridge to the further component, and wherein at least the contact region of the second welding electrode with the further component is heated by a flow of electric current for heating in the second circuit. It has been found that, with the use of a second circuit, which conducts current over the component by way of the second welding electrode in the welding area, heating of the welding area can be easily achieved and this heating can be variably set by means of the current intensity of the flow of current for heating. This allows the layer of thermoplastic material to be heated easily and efficiently and the pressing together to be achieved efficiently by the application of the first force, it already being possible for the first force to be kept low. The welding can subsequently take place by means of the (first) circuit, with application of the second force. If a number of further components are provided, at least one component is part of the second circuit. It is also possible however for a number of the further components to be part of the second circuit.

It is likewise conceivable that the heating is alternatively or additionally realized for example by heating elements or temperature-controlled electrodes (for example a temperature-controlled first electrode and/or a temperature-controlled second electrode). With use of a second circuit, it is however advantageous that the cycle time can be reduced, while conventional resistance welding devices (for example resistance welding tongs) can be used.

With preference, the second circuit is interrupted during the welding operation, i.e. in the second phase. This prevents the risk of secondary currents between the current sources of the first and second circuits passing over the component and the sandwich sheet.

With preference, a resistance measurement is carried out during the method, wherein the electrical resistance between the two metallic outer layers of the sandwich sheet is measured. The measurement of the resistance between the metallic outer layers of the sandwich sheet can be used for example to establish when the metallic outer layers are in metallic contact and the electrical resistance drops abruptly.

With further preference, the current in the first circuit and/or in the second circuit is controlled dependently on the resistance measurement. For example, the currents of the two circuits may be controlled in such a way that, when there is a fall in the resistance in the second circuit to almost zero, that is to say when the two metallic outer layers are in contact with one another, the circuit of the second circuit, which is used for heating, is interrupted and the first circuit, which is used for formation the resistance welding location, is closed. The time profile of the flow of current for welding or the flow of current for heating may likewise be controlled dependently on the resistance measurement. An optimization of the method with regard to a shortest possible cycle time can consequently be brought about by the resistance measurement.

According to a further refinement of the method, the maximum current of the flow of electric current for heating in the first phase is lower than the maximum current of the flow of electric current for welding in the second phase. The lower maximum current of the flow of electric current for heating (for example in the second circuit) in the first phase initially allows efficient heating of the layer of thermoplastic material to be achieved, so that the outer layers of the sandwich sheet can be reliably pressed together. The subsequent comparatively higher maximum current of the flow of electric current for welding (for example in the first circuit) in the second phase achieves the effect of reliable welding with a high current density.

According to a further refinement of the method, the ratio of the thickness of the further component to the thickness of the metal sheet is greater than 4, in particular greater than 5. The metal sheet is for example an outer layer of a sandwich sheet. In the case of more than one further component, the ratio with respect to the thickness of a number of further components or all of the further components may for example be greater than 4 (or 5). For example, the ratio of the thickness of the further component with the greatest thickness to the thickness of the metal sheet is greater than 4 (or 5). In the case of more than one metal sheet, the ratio with respect to the thickness of a number of metal sheets or all of the metal sheets may for example be greater than 4 (or 5). For example, the ratio of the thickness of the component to the thickness of the sheet with the smallest thickness is greater than 4 (or 5). For example, the ratio of the thickness of the component with the greatest thickness to the thickness of the metal sheet with the smallest thickness is greater than 4 (or 5). It has been found that, with such relative thicknesses of the elements to be welded, the connection of the thinner metal sheets is particularly critical. The method achieves the effect that a reliable connection can take place even in the case of such relative thicknesses.

According to a further refinement of the method, the current of the flow of electric current for welding in the second phase is pulsed at least for a time. It has been found that in this way welding defects in the form of spatter can be reduced. This means that a reduction in the strength of the welded connection can be avoided and as a result a still more reliable method can be provided.

According to a further refinement of the method, in the second phase the metal sheet is subjected initially to the first force and subsequently to the second force at least for a time during the flow of electric current for welding. This allows welding in which both a high welding force (through the first force) and a high current density (through the flow of electric current for welding during the second force) can be achieved to take place during the flow of electric current for welding.

According to a further refinement of the method according to the invention, the maximum current of the flow of electric current for welding in the second phase while the metal sheet is being subjected to the first force is higher than the current of the flow of electric current for welding in the second phase while the metal sheet is being subjected to the second force. On account of the initially greater (first) force in the second phase, a higher maximum current can be used, while subsequently, on account of the lower (second) force, a lower maximum current can be used, and a high current density is nevertheless achieved on account of the smaller contact area between the metal sheet and the first welding electrode. For example, in the second phase a first power pulse current may be used initially during the application of the first force and a second power pulse current used during the application of the second force. The maximum current of the pulses of the first power pulse current may for example be higher here than the maximum current of the pulses of the second power pulse current. For example, the pulses of the first power pulse current are shorter than the pulses of the second power pulse current.

According to a further refinement of the method, the first force and/or the second force is kept constant at least for a time. In this way, a reliable and reproducible welding result can be achieved. For example, in the first phase the force exerted on the metal sheet by the first welding electrode increases and is kept constant for a time. For example, during the transition into the second phase the force exerted on the metal sheet by the first welding electrode is reduced to the first force and is kept constant for a time. For example, it is only during the second phase that the force exerted on the metal sheet by the first welding electrode is reduced to the first force and subsequently kept constant for a time.

According to a second teaching, the object mentioned at the beginning is achieved by means for applying force being provided, in order in a first phase to subject the metal sheet at least for a time to a first force at least by the first welding electrode and in order in a second phase to subject the metal sheet at least for a time to a second force at least by the first welding electrode during the flow of electric current for welding, the second force being lower than the first force.

As already stated, the use of a first force in a first phase initially allows a contact of the metal sheets and/or components to be welded with respect to one another to be ensured, while subsequently, in a second phase, the use of a second force, lower in comparison with the first force, on the side of the metal sheet during the flow of electric current for welding means that the contact area between the first welding electrode and the metal sheet is reduced. This leads to an increase in the current density in the region of the first welding electrode or in the region of the metal sheet contacted therewith, so that the input of energy in the region of the metal sheet is sufficient to easily achieve a connection of the metal sheet to the other metal sheets and/or components by welding.

The means for applying force comprise for example the first welding electrode and/or the second welding electrode, for example the means comprise a welding tongs. The means for applying force comprise for example means for exerting a mechanical force on the first welding electrode and/or the second welding electrode in the direction of the metal sheet or component. The means for applying force may also comprise a control for setting the first force and/or the second force.

Preferably, the device comprises a welding robot, so that it can for example be used for automatic joining of the metal sheets and further components.

The device is set up in particular for carrying out exemplary embodiments of the method. That is to say that the device is set up for example for arranging the at least one metal sheet and the at least one further component between the first welding electrode and the second welding electrode. For example with an inserted metal sheet and further component, the device is set up for the first welding electrode to be in contact with the metal sheet and the second welding electrode, opposite the first welding electrode, to be in contact with the further component on the side of the further component that is facing away from the metal sheet. For example, with an inserted metal sheet and further component, the device is set up for welding the metal sheet to the further component by a flow of electric current for welding in a (first) circuit comprising the metal sheet, the further component, the first welding electrode and the second welding electrode.

According to a refinement of the device, the means for applying force are set up for displacing by the first force a heated layer of thermoplastic material arranged between two metallic outer layers of a sandwich sheet out of the welding area by pressing together the outer layers. In this way, a welding of sandwich sheets to further components can be easily realized in a reliable way. For example, in the first phase the contact of the outer layers is ensured by displacing the layer of plastic by means of the first force and in the second phase a sufficient current density in the region of the outer layers is achieved by means of the second force.

According to a refinement of the invention, a control with which a pulsed current of the flow of electric current for welding (for example in the first circuit) can be provided at least for a time during the second phase is provided. In this way, the risk of spatter during the welding in the second phase can be reduced. For example, the control is set up in such a way that in the second phase a first power pulse current is generated initially (for example during application of the first force) and a second power pulse current is generated subsequently (for example during application of the second force). The maximum current of the pulses of the first power pulse current may for example be higher here than the maximum current of the pulses of the second power pulse current. For example, the pulses of the first power pulse current are shorter than the pulses of the second power pulse current.

According to a refinement of the device, means for providing a second circuit are provided, wherein the second circuit comprises at least the second welding electrode, at least partially the further component and a current bridge, so that a contact region between the second welding electrode and the component can be formed in such a way that the contact region can be heated by a flow of current in the second circuit. The device is consequently particularly suitable for welding a sandwich sheet having a layer of plastic to one or more further components, since, with the second circuit, the layer of thermoplastic material of the sandwich sheet can be heated in order that it can be displaced from the welding area before the welding.

If means for measuring the electrical resistance between the metallic outer layers of the sandwich sheet are provided, it can be easily established whether the two metallic outer layers are already in metallic contact with one another.

The contact between the metallic outer layers may be used for controlling the sequence of the welding process. Provided for example is a control that controls the flow of current in the first circuit and/or in the second circuit at least dependently on the measurement of the electrical resistance between the metallic outer layers. In this way, further automation and optimization of the resistance welding of sandwich sheets is achieved.

Provided with preference is a control with which a constant and/or pulsed flow of current can be generated at least for a time in the first circuit and/or in the second circuit. Particularly advantageously, the preheating process can be carried out in a controlled and reproducible manner by the setting of a substantially constant current, while the actual resistance welding can be carried out in a controlled and reproducible manner by the setting of a pulsed current.

The current bridge of the second circuit may be formed for example as a contact electrode, which is in contact with the further component (or at least one of these), so that this electrode can be brought into contact with the metallic component and easily provide the circuit for the preheating current, for example by pressing against the metallic component.

Preferably provided for the positioning of the current bridge is a handling system, portal system or robot for positioning, so that any desired position of the current bridge on the further component can be used, in particular in connection with the given welding position, in order to realize a shortest possible current path for the preheating current.

Positioning of the current bridge close to the welding electrode that is in contact with the metallic component is performed particularly easily by providing that the current bridge, formed as a contact electrode, is arranged at a fixed distance from the second welding electrode and is preferably connected to it in a mechanically fixed manner. Then, during positioning of the welding electrode on the further component, the contact electrode is for example automatically positioned on the further component.

With respect to further advantageous refinements of the device, reference is made to the description of the embodiments of the method and the advantages thereof.

The foregoing or following description of method steps according to preferred embodiments of the method according to the invention is also intended to disclose corresponding means for carrying out the method steps by preferred embodiments of the device according to the invention. Likewise, the disclosure of means for carrying out a method step is intended to disclose the corresponding method step.

Figure 1:
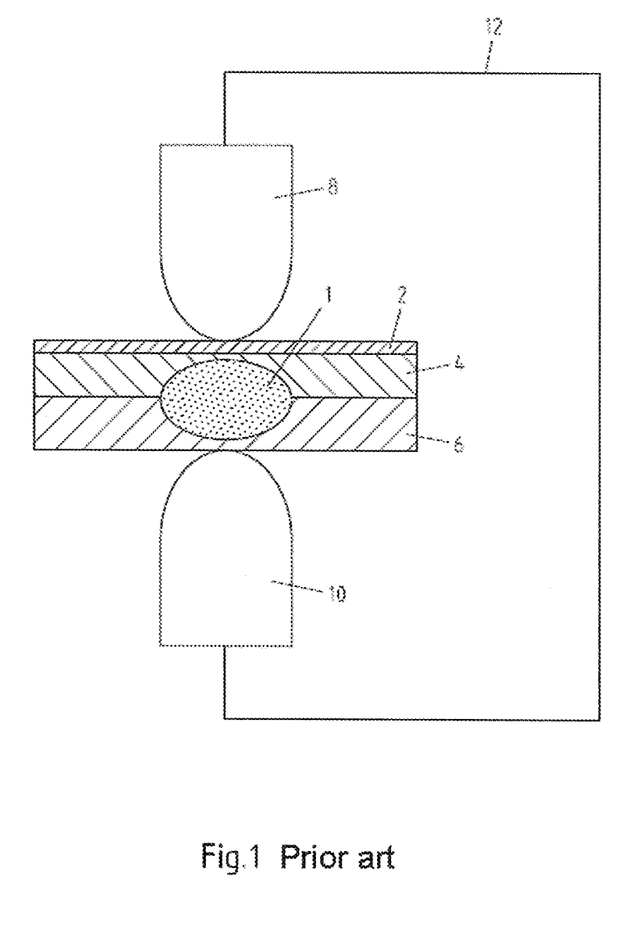
FIG. 1 is a schematic side cross-section view of a prior art method showing the formation of a weld nugget during the welding of a metal sheet to a first metallic component and a second metallic component.

FIG. 1 initially shows in a schematic sectional representation the formation of a weld nugget 1 during the welding of a thin metal sheet 2 to a first metallic component 4 and a second metallic component 6 according to the prior art. By means of the first welding electrode 8 and the second welding electrode 10, a welded connection is to be produced by means of resistance spot welding (RSW). The components consist for example of steel. The first welding electrode 8 is in this case in contact with the metal sheet 2. The second welding electrode 10 is in contact with the component 6. The component 4 is arranged between the metal sheet 2 and the component 6. The weld nugget 1 is formed by a flow of current for welding in a circuit 12, which comprises the first welding electrode 8, the second welding electrode 10, the metal sheet 2, the first component 4 and the second component 6. As can be seen, the first component 4 and the second component 6 are fused by the weld nugget 1, and consequently by the welded connection. However, the metal sheet 2, which is thinner in comparison with the components 4, 6, is not fused by the weld nugget 1, which is attributable inter alia to the comparatively great difference in thickness between the metal sheet 2 and the components 4, 6.

Figure 2A:
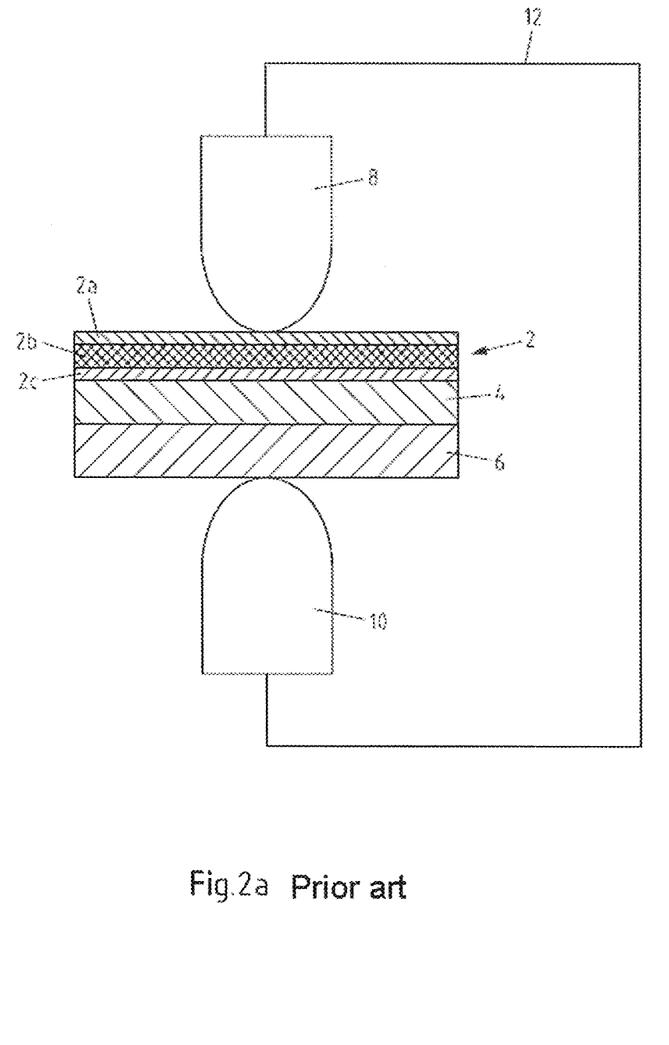
FIGS. 2a and 2b are schematic side cross-section views showing a prior art method for welding a sandwich sheet to a first metallic component and a second metallic component.
Figure 2B:
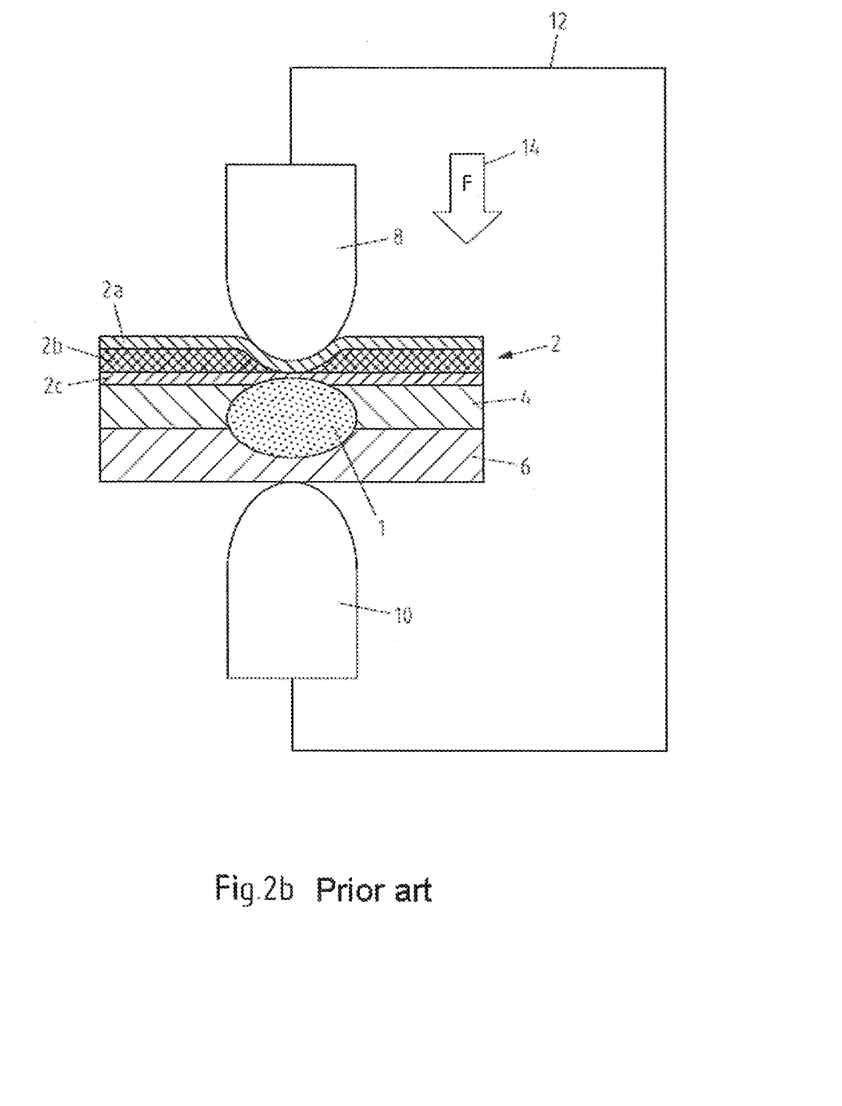

FIGS. 2a and b show a further method for welding a sandwich sheet 2 to a first further component 4 and a second further component 6 according to the prior art in schematic sectional representations. In this case, the sandwich sheet 2 comprises two metal sheets in the form of metallic outer layers 2a and 2c and a layer of thermoplastic material 2b arranged in between.

As can be seen in FIG. 2a, the arrangement corresponds substantially to that shown in FIG. 1, while, as a difference from FIG. 1, the first outer layer 2a is now in contact with the first welding electrode 8 and the second outer layer 2c is in contact with the first component 4.

Since the layer of thermoplastic material 2b is not electrically conducting, it must be displaced from the welding area. For this purpose, the layer 2b is for example heated up in the welding area and forced out from the welding area. For this purpose, the metal sheet 2 and the components 4, 6 are pressed together with a force by the welding electrodes 8, 10, so that in particular the metal sheet 2a is subjected to a force by the first welding electrode 8, illustrated by the arrow 14. However, it can be seen that in this case the weld nugget 1 fuses the metal sheet 2c of the sandwich sheet, but not the metal sheet 2a. It has been found that, although a high current density is achieved in the region of the second welding electrode 10, it is not achieved in the region of the first electrode 8. This has the effect of producing an incomplete connection of the sandwich sheet 2 to the components 4, 6, which does not have the desired characteristics.

Figure 3A:
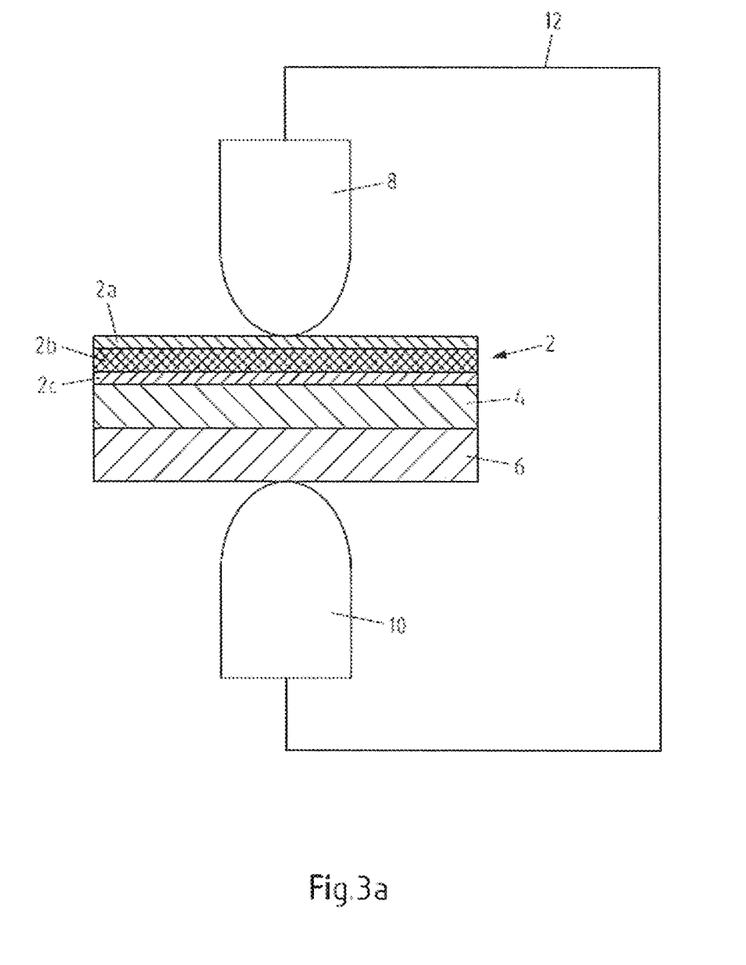
FIGS. 3a-3c are schematic side cross-section views showing steps at various points in time of an embodiment of a method for welding a metal sheet to a metallic component, as disclosed herein.
Figure 3B:
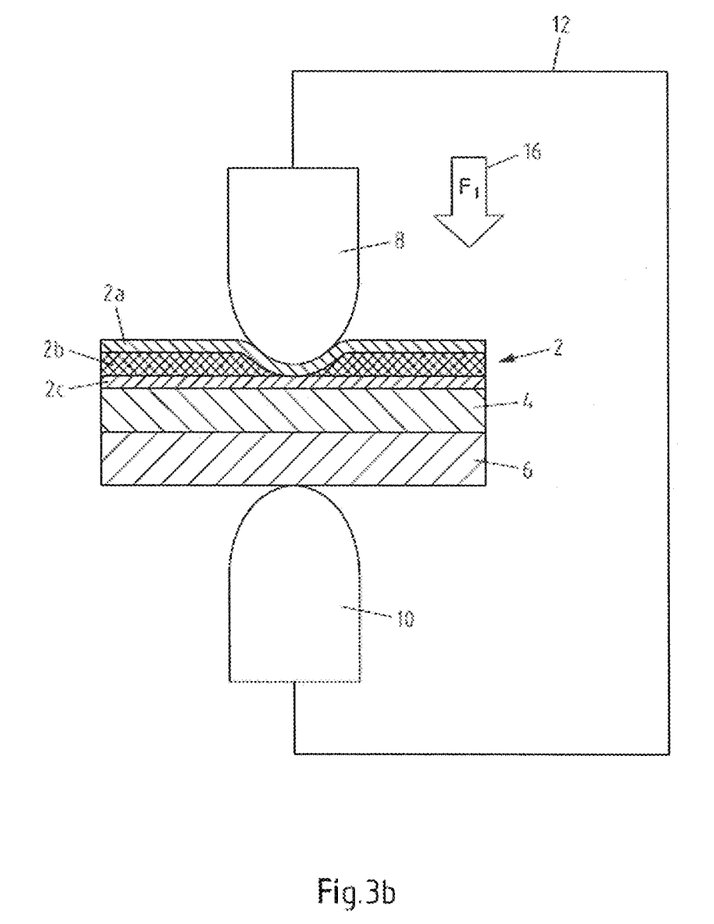
Figure 3C:
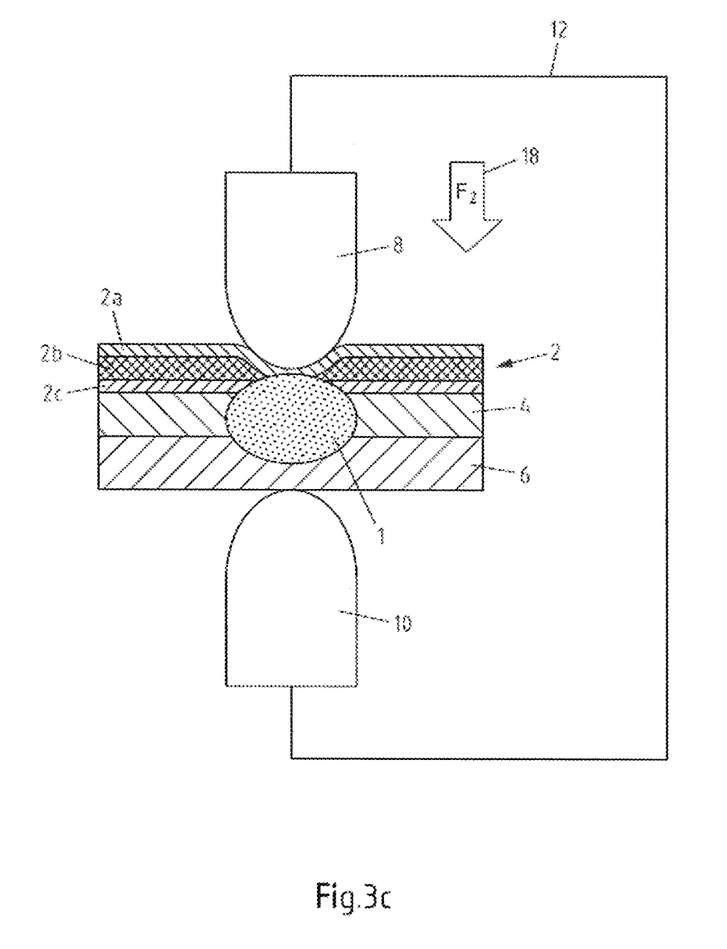

FIGS. 3a, b and c then schematically show an exemplary embodiment of the method that is carried out with an exemplary embodiment of a device at various points in time in a schematic sectional representation.

FIG. 3a firstly shows the starting point that is already represented in FIG. 2a, that is to say a schematic sectional representation of a first component 4 and a second component 6 and a sandwich sheet 2 that is to be welded thereby. In this case, the sandwich sheet 2 in turn comprises the two metal sheets 2a, 2c, in the form of a first metallic outer layer 2a and a second metallic outer layer 2c, and a layer of thermoplastic material 2b arranged in between. As abovementioned, the components 4, 6 have a much greater thickness than the metal sheets 2a, 2c. The first layer 2a is in turn in contact with the first welding electrode 8 and the second outer layer 2c is in contact with the first component 4. The second welding electrode 10 is therefore in contact with the component 6 on the side of the component 6 that is facing away from the metal sheet 2a and the first component 4.

As shown in FIG. 3b, then, in order initially to establish a contact between the first metal sheet 2a and the second metal sheet 2c, in a first phase the metal sheet 2a is subjected to a first force $F_1$ by the first welding electrode 8. This is represented in FIG. 3b by the arrow 16. At the same time, the layer of thermoplastic material 2b is heated in such a way that the layer of thermoplastic material 2b softens. This may take place for example by the welding electrodes 8, 10 being heated or by external heating elements heating the sandwich sheet 2. With preference, however, this takes place by providing that a further circuit, which comprises the second welding electrode 10, at least partially the further component 6 and a current bridge (cf. FIG. 4), is provided for heating the region of the sandwich sheet 2 that is to be welded. A flow of electric current for heating in this second circuit has the effect of heating the contact region of the second welding electrode 10 with the further component 6, whereby a softening of the layer of plastic 2b is achieved. The first force is in this case chosen such that pressing together of the first metal sheet 2a and the second metal sheet 2c is possible and it can be ensured that contact between the metal sheets 2a, 2c is produced. This means that the surface of the welding electrode 8 is partially formed into the metal sheet 2a, as can be seen in FIG. 3b. In order to form the contact reliably, with preference the force $F_1$ is kept constant for a time.

The first phase consequently serves for ensuring sufficient contact between the individual layers 2a, 2c to be welded, which is achieved by heating the layer 2b and a sufficient first force 16.

A second phase of the method for welding is then represented in FIG. 3c. The actual welding of the sandwich sheet 2 to the components 4, 6 then takes place by a flow of electric current for welding in the first circuit 12, with a weld nugget 1 formation. A pulsed current is used with preference here, which reduces the formation of spatter (cf. FIGS. 5 and 6). As indicated by the arrow 18, however, as a difference from FIG. 2b, in particular the metal sheet 2a is subjected at least for a time to a second force $F_2$ by the first welding electrode 8 during the flow of electric current in the first circuit 12. With preference, the force $F_2$ is kept constant for a time. The second force $F_2$ is in this case smaller than the first force $F_1$. For setting the desired force at the welding electrodes 8, 10, means for applying force that can be correspondingly set may be provided.

In the second phase, during the flow of electric current for welding, the use of a second force $F_2$, lower in comparison with the first force $F_1$, on the side of the metal sheet 2a consequently allows the contact area between the first welding electrode 8 and the metal sheet 2a to be reduced, which is represented in FIG. 3c by the slight spacing with respect to the metal sheet 2a in the peripheral region of the first welding electrode 8. This leads to an increase in the current density in the region of the metal sheet 2a contacted with the first welding electrode 8. This has the effect that the weld nugget 1 then substantially also fuses the entire metal sheet 2a, since the increased current density achieves the effect in an easy and low-cost way that the input of energy in the region of the metal sheet 2a is sufficient to achieve a connection of the metal sheet 2a to the other layers, that is to say the metal sheet 2c and the components 4, 6, by welding.

Figure 4:
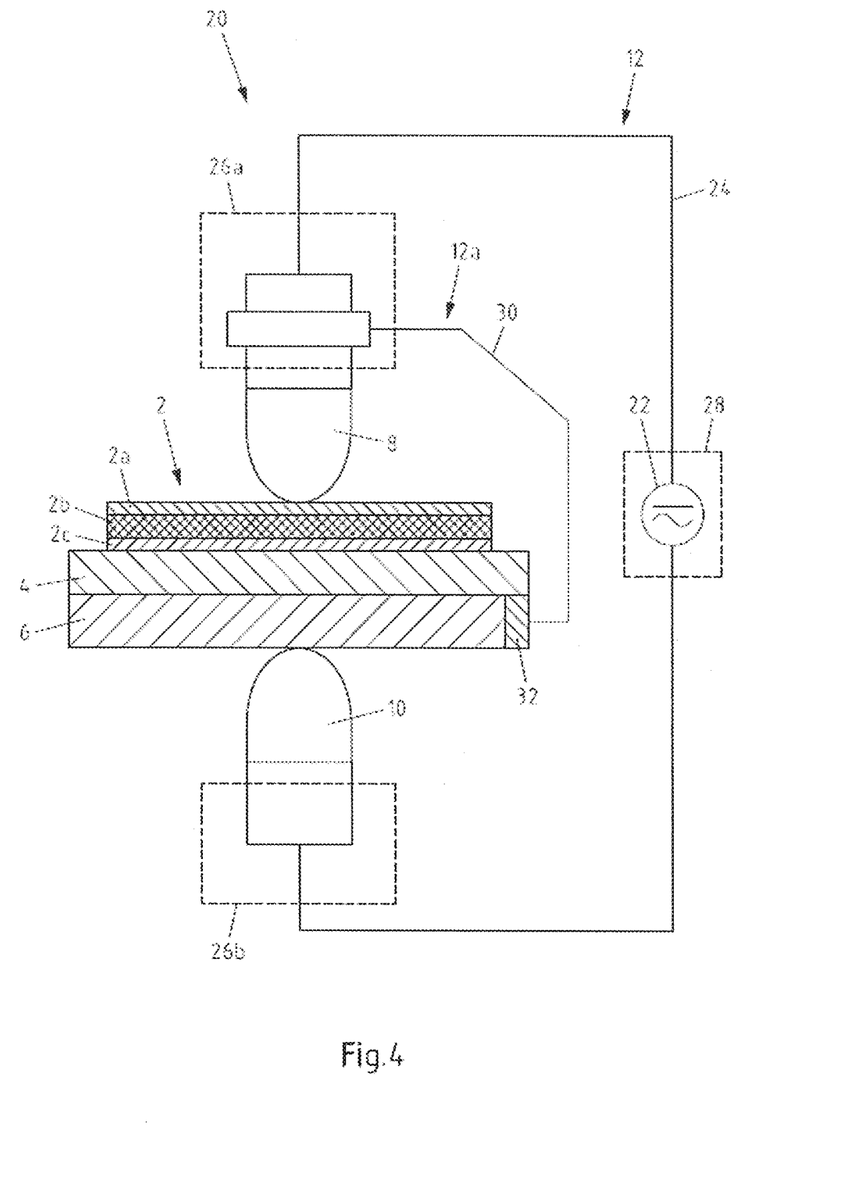
FIG. 4 is a schematic side cross-sectional view of an embodiment of a device for welding a metal sheet to at least one additional metallic component, as disclosed herein.

FIG. 4 schematically shows an exemplary embodiment of a device 20 for the resistance welding of the metal sheets 2a, 2c to the further metallic components 4, 6. The device is suitable for example for carrying out the method described in connection with FIGS. 3a-c. The device 20 has a first welding electrode 8 and a second welding electrode 10 for producing the welded connection. Furthermore, with the current source 22 and the electrical lines 24, the device 20 has means for providing a circuit 12, which can conduct a flow of electric current for welding by way of the first welding electrode 8 and the second welding electrode 12. Furthermore, means 26a, 26b for applying force are provided. With the aid of the means 26a, 26b, in a first phase the metal sheet 2a can be subjected to a first force $F_1$ by the first welding electrode 8 and in a second phase the metal sheet 2a can be subjected to a second force $F_2$ by the first welding electrode 8 during the flow of electric current for welding. The forces can be set in such a way here that the second force $F_2$ is lower than the first force $F_1$. The means for applying force 26a, 26b may for example comprise a welding tongs, which is set up for exerting different forces. The means for applying force 26a, 26b may also comprise other means, in order to exert a mechanical force on the first or second welding electrode 8, 10 in the direction of the metal sheet 2a or the component 6, respectively. In particular, the means for applying force 26a, 26b may also comprise a control for setting the first and/or the second force $F_1$, $F_2$. The means for applying force 26a, 26b may also be realized by a welding robot.

The device 20 additionally comprises a control 28, with which a pulsed current can be provided. In this way, a pulsed current for the flow of electric current for welding can be provided, in particular during the second phase (cf. FIGS. 5 and 6).

Finally, with the current source 22 and the electrical conductors 24, 30, the device 20 comprises means for providing a second circuit 12a. The second circuit comprises furthermore the second welding electrode 10, at least partially the further component 6 and a current bridge 32. The contact region between the second welding electrode 10 and the component 6 is formed here in such a way that the contact region can be heated by a flow of current in the second circuit 12a. This allows the heating of the layer of plastic 2b to take place effectively and the pressing together of the metal sheets 2a, 2c in the first phase of the first force $F_1$ to be made possible efficiently.

Figure 5:
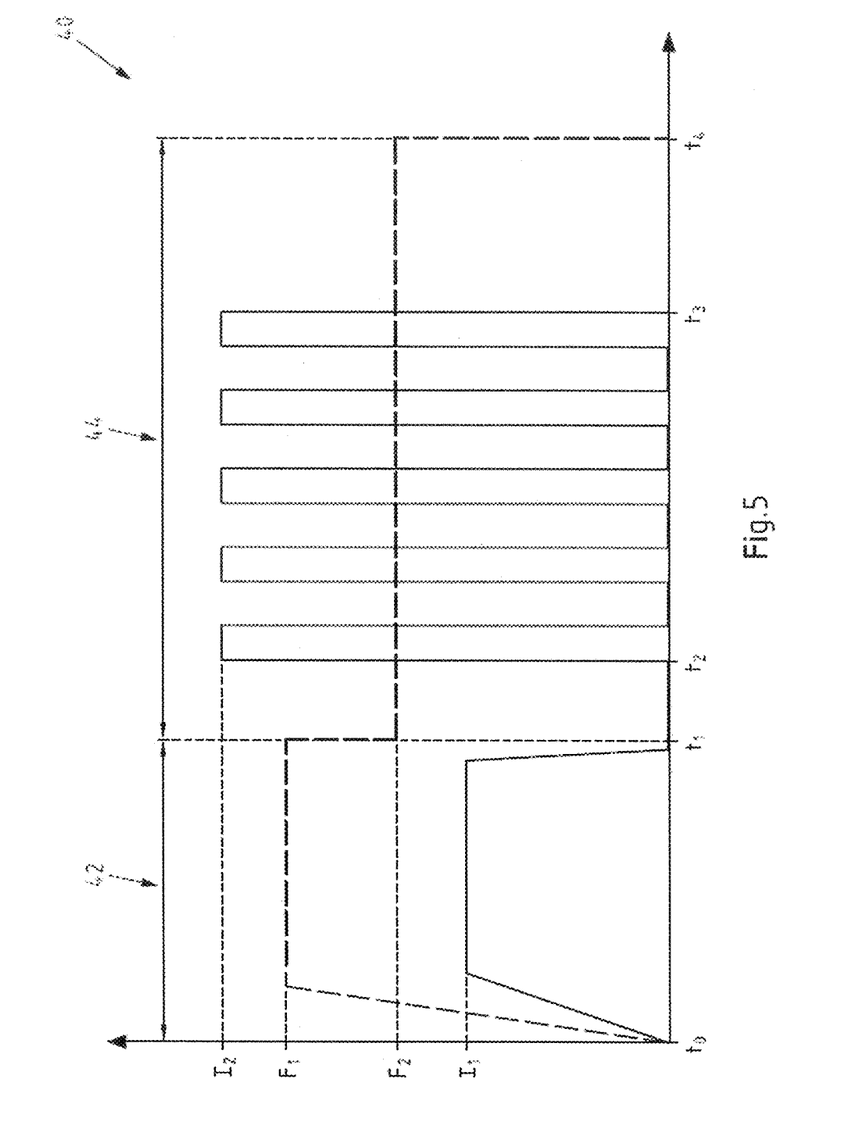
FIGS. 5 and 6 are graphs showing a profile of the flow of electric current and the application of force over time, for various embodiments of a method of the present disclosure.
Figure 6:
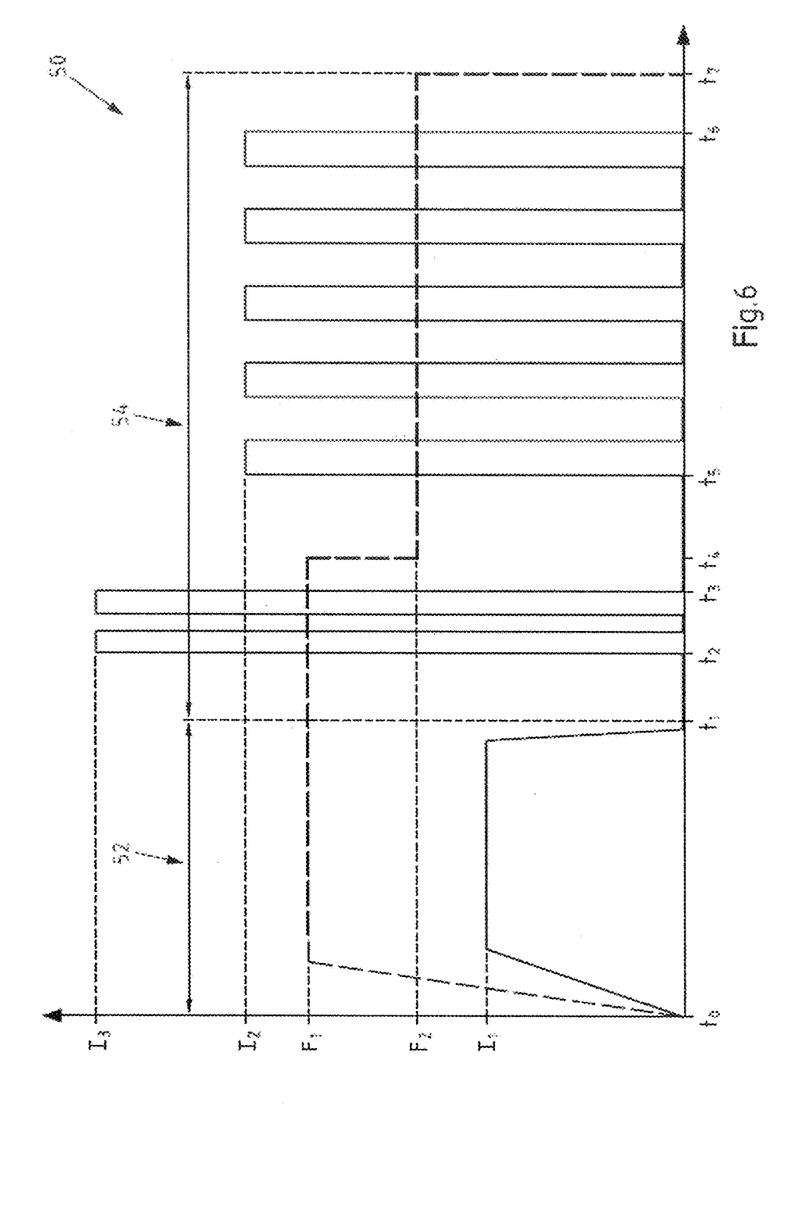

FIGS. 5 and 6 schematically show two different exemplary embodiments of the qualitative time profile of the flow of current and the application of force during different exemplary embodiments of the method according to the invention.

FIG. 5 shows a time-current or time-force diagram 40, the time being plotted on the x axis and the current or the force being plotted on the y axis. The current is depicted here by solid lines and the force by dashed lines. The current may in this case be the current flowing in the circuit 12 for welding or the current flowing in the circuit 12a for heating. The force is in this case the force that is exerted on the metal sheet 2a by the first welding electrode 8 (cf. FIGS. 3 and 4). Starting from the time $t_0$, which is shown for example in FIG. 3a, in a first phase 42, which extends in time from the time $t_0$ to the time $t_1$, the force is initially increased up to the value of the first force $F_1$ and kept constant. At the same time, the current in the second circuit 12a, which comprises the current bridge 32, the component 6 and the second welding electrode, is set to a value $I_1$ and likewise kept constant. This flow of current for heating in the second circuit 12a has the effect that the layer of plastic 2b is heated and softened, so that the metal sheet 2a is pressed against the metal sheet 2c on account of being subjected to the force $F_1$ by the first welding electrode 8 (cf. FIG. 3b). When the metal sheet 2a contacts the metal sheet 2c, the current for heating is switched off at the time $t_1$. This can be established for example by measuring the fall in the resistance during a resistance measurement between the outer layers 2a, 2c of the sandwich sheet 2. In addition, at the time $t_1$ the force is reduced to the force $F_2$.

In a second phase 44, which extends in time from the time $t_1$ to the time $t_4$, after the reduction in the force to $F_2$, the force that the first welding electrode exerts on the metal sheet 2a is initially kept constant at $F_2$. While the metal sheet 2a is being subjected to the force $F_2$, which is lower in comparison with $F_1$, in the time period from $t_2$ to $t_3$ a pulsed current for welding is generated in the first circuit 12, which comprises the first welding electrode 8 and the second welding electrode 10. The maximum current of the pulsed flow of current ($t_2$ to $t_3$) is in this case greater than the maximum flow of the flow of current for heating ($t_0$ to $t_1$). The pulsed current then brings about welding such as that represented by the weld nugget 1 in FIG. 3c, while the reduced application of force $F_2$ has the effect that a contact area between the first welding electrode 8 and the metal sheet 2a that is reduced in comparison with the end of the first phase is formed, which produces a high current density in the region of the metal sheet 2a, so that reliable welding is made possible. After welding, the application of force by the first (and the second) welding electrode can be omitted at the time $t_4$.

FIG. 6 shows a second example of a time-current or time-force diagram 50, which represents a time profile of current or force similar to the profile described in connection with FIG. 5. To this extent, reference is initially made to FIG. 5. As a difference from FIG. 5, the force applied is not reduced to the second force $F_2$ at the end of the first phase 52, but continues to be kept constant until the time $t_4$ in the second phase 54. After the contact of the metal sheets 2a, 2c and the switching off of the flow of current for heating, from the time $t_2$ to $t_3$ in the second phase 54 and while the first force $F_1$ is being applied, a power pulse current is generated in the first circuit 12 for welding. Subsequently, at the time $t_4$, the force applied to the first metal sheet 2a by the first welding electrode 8 is reduced from the force $F_1$ to the force $F_2$, whereupon, from the time $t_5$ to $t_6$, a further power pulse current for welding is generated with the application of a force reduced to the force $F_2$, as already described in connection with FIG. 5. The maximum current $I_3$ of the first pulsed flow of current between $t_2$ and $t_3$ is in this case less than the maximum current $I_2$ of the second pulsed flow of current between $t_5$ and $t_6$. In addition, the first pulsed flow of current has shorter pulses than the second pulsed flow of current and is generated over a shorter time period. After the welding, the application of force by the first (and the second) welding electrode can be omitted at the time $t_7$.

The control of the force and the current on the basis of the example in FIG. 6 has the advantage that welding in which both a high welding force (through the first force $F_1$) and a high current density (through the flow of electric current for welding during the second force $F_2$) can be achieved in the second phase 54 can take place.

Figure 7A:
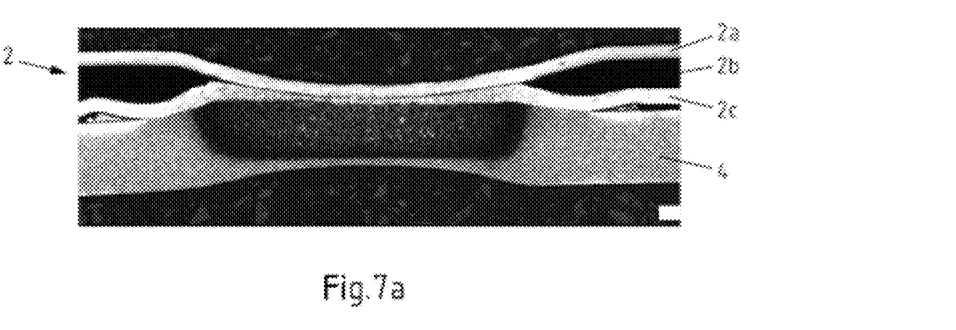
FIG. 7a is a photograph showing a cross-sectional view of a welded connection formed by a method of the prior art.
Figure 7B:
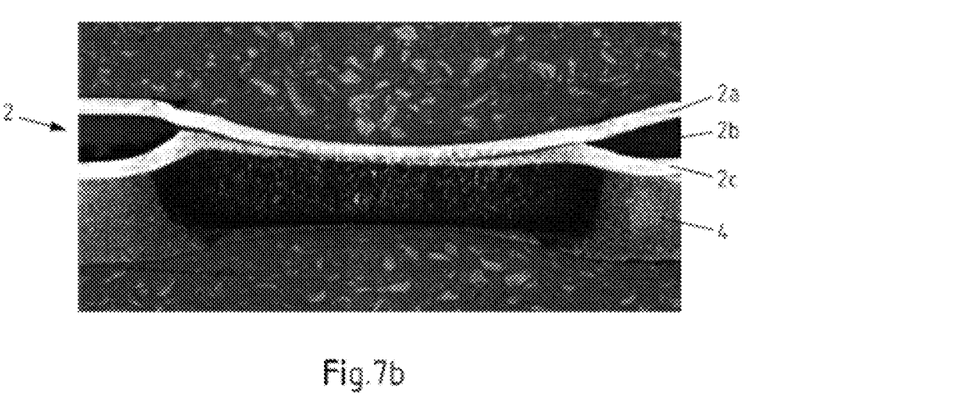
FIG. 7b is an photograph showing a cross-sectional view of a welded connection formed by an embodiment of a method of the present disclosure.

FIG. 7a finally shows a cross section through a sandwich sheet 2 that has been welded to a component 4 according to the prior art. FIG. 7b, on the other hand, shows a cross section through a sandwich sheet 2 that has been welded to a component 4 according to an embodiment of the method according to the invention. It can be seen that the metal sheet 2a has not been connected in the case of the welded connection according to the prior art in FIG. 7a, while in FIG. 7b it can be seen that the metal sheet 2a has been connected to the metal sheet 2c and the component 4.

What is claimed is:

1. A method for direct resistance welding a sandwich sheet, having a thermoplastic core layer disposed between opposing first and second metal sheet outer layers, to at least one metallic component, the method comprising:
    positioning the at least one metallic component into contact with the first metal sheet outer layer;
    contacting the second opposing metal sheet outer layer with a first welding electrode, which second metal sheet outer layer faces away from the at least one metallic component;
    placing a second welding electrode in contact with a side of the metallic component facing away from the sandwich sheet, such that said second electrode is positioned directly opposite said first electrode to define a welding area there between;
    in a first phase in which no welding occurs,
        heating a region of the sandwich sheet until it reaches a temperature sufficient to soften the thermoplastic layer,
        pressing at least the first welding electrode onto the second metal sheet for a first predetermined period of time and with a first force sufficient to force together the sandwich sheet's first and second metal sheet outer layers, thereby displacing the softened thermoplastic layer out from between the first and second outer layers in the welding area of the sandwich sheet;
    in a second welding phase,
        direct resistance welding both of the first and second metal sheets of the sandwich sheet to the metallic component by application of a welding electric current flow through each of the first electrode, the first and second metal sheets, the metallic component, and the second electrode, such that a weld nugget is formed between each of the first and second metal sheets and the metallic component, in the welding area;
        during the flow of the electric welding current, pressing at least the first welding electrode onto the second metal sheet with a second force for a second predetermined period of time, the magnitude of the second force being smaller than the magnitude of the first force.

2. The method of claim 1, wherein said at least one metallic component includes a first metallic component positioned adjacent to and in contact with a second metallic component, such that said positioning step results in the first metallic component being sandwiched between the sandwich sheet and the second metallic component, said placing step results in the second welding electrode being in contact with the second metallic component, and said welding step results in the first and second metal sheets of the sandwich sheet being welded to each of the first and second metallic components.

3. The method of claim 1, wherein said heating step is performed, at least at a contact region of the second welding electrode with the metallic component, by applying a flow of electrical current through at least a second electrical circuit that electrically connects the second welding electrode at least partially to the metallic component, and a current bridge of the metallic component.

4. The method of claim 3, wherein the maximum current of the flow of electric current for heating in the first phase is lower than the maximum current of the flow of electric current for welding in the second phase.

5. The method of claim 1, wherein a ratio of the thickness of metallic component to the thickness of one of the first or second metal sheets is greater than 4:1.

6. The method of claim 1, wherein the electric welding current in the second phase is pulsed at least for a predetermined amount of time.

7. The method of claim 1, wherein during the second phase, the second metal sheet is subjected initially to the first force and subsequently to the second force, at least for a portion of the time during which the flow of the electric welding current is being applied.

8. The method of claim 7, wherein the maximum current of the flow of electric welding current in the second phase, while the second metal sheet is being subjected to the first force, is higher than the current of the flow of electric welding current in the second phase, while the second metal sheet is being subjected to the second force.

9. The method of claim 1, wherein the first force and the second force are each maintained at a constant value, for at least a portion of time during which they are applied.

10. A device for the direct resistance welding of a sandwich sheet to a metallic component, the sandwich sheet having a thermoplastic core layer disposed between opposing first and second metal sheet outer layers, the device comprising:
    an electrical welding current source configured to provide a flow of electrical current sufficient for resistance welding at least one metal sheet;
    a first welding electrode in electrical communication with said electrical welding current source;
    a second welding electrode in electrical communication with each of said first welding electrode and said electrical welding current source, at least said current source, said first electrode, and said second electrode together defining a first electrical circuit and configured to weld the at least one metal sheet by way of said first and second electrodes;
    a means for heating the thermoplastic layer of the sandwich sheet to a temperature sufficient to soften the thermoplastic layer;
    welding tongs having a first arm on which is disposed said first welding electrode, and a second arm disposed opposite said first arm on which second arm is disposed said second welding electrode, said first and second welding electrodes disposed opposite each other and facing each other;

a control in electrical communication with said welding tongs and said means for heating the thermoplastic layer, said control being configured to, in a first phase during which no welding occurs,
energize said means for heating the thermoplastic layer of the sandwich sheet to a temperature sufficient to soften the thermoplastic layer,
actuate said welding tongs to impart a first force from said first electrode onto the second metal sheet outer layer for a predefined period of time, so as to displace, by the first force, the heated layer of thermoplastic material out of a welding area between the first and second welding electrodes, by pressing together the first and second metal sheet outer layers of the sandwich sheet, and in a second welding phase,
activate said welding tongs to apply a second force from said first electrode onto the second metal sheet for a predefined period of time during which a flow of electrical welding current is simultaneously being applied to the second metal sheet, the second force being lower than the first force.

11. The device of claim 10, wherein the control is further in electrical communication with said electrical welding current source and configured to provide at least a pulsed electrical welding current during at least a portion of the second phase.

12. The device of claim 10, further comprising a second electrical circuit that includes at least said second welding electrode, at least partially the metallic component and a current bridge, such that a contact region between said second welding electrode and the metallic component can be formed so as to heat the contact region by a flow of current in said second circuit.

* * * * *